(12) United States Patent
Fadida et al.

(10) Patent No.: US 10,237,266 B2
(45) Date of Patent: Mar. 19, 2019

(54) PRIVILEGED SHARED ACCOUNT PASSWORD SANITATION

(71) Applicant: CA, Inc., New York, NY (US)

(72) Inventors: Itzhak Fadida, Haifa (IL); Guy Balzam, Raanana (IL); Amir Jerbi, Givatayim (IL); Nir Barak, Karmi Yosef (IL)

(73) Assignee: CA, Inc., New York, NY (US)

( * ) Notice: Subject to any disclaimer, the term of this patent is extended or adjusted under 35 U.S.C. 154(b) by 151 days.

(21) Appl. No.: 15/040,137

(22) Filed: Feb. 10, 2016

(65) Prior Publication Data

US 2016/0191495 A1 Jun. 30, 2016

Related U.S. Application Data

(63) Continuation of application No. 14/195,279, filed on Mar. 3, 2014, now Pat. No. 9,367,673.

(51) Int. Cl.
| | | |
|---|---|---|
| *G06F 21/31* | (2013.01) | |
| *G06F 21/53* | (2013.01) | |
| *G06F 21/62* | (2013.01) | |
| *G06F 21/78* | (2013.01) | |
| *H04L 29/06* | (2006.01) | |

(52) U.S. Cl.
CPC ............ *H04L 63/083* (2013.01); *G06F 21/31* (2013.01); *G06F 21/53* (2013.01); *G06F 21/62* (2013.01); *G06F 21/78* (2013.01); *H04L 63/102* (2013.01)

(58) Field of Classification Search
CPC ........ G06F 21/00; G06F 21/30; G06F 21/305; G06F 21/31; G06F 21/41; G06F 21/50; G06F 21/52; G06F 21/53; G06F 21/57; G06F 21/577; G06F 21/60; G06F 21/604; G06F 21/62; G06F 21/70; G06F 21/78; G06F 21/79; G06F 21/80; G06F 2221/21; G06F 2221/2101; G06F 2221/2141; G06F 2221/2143; G06F 2221/2149; G06F 21/45; G06F 21/55; H04L 63/00; H04L 63/08; H04L 63/083; H04L 63/0815; H04L 63/10; H04L 63/101; H04L 63/102; H04L 63/105; H04L 63/20
See application file for complete search history.

(56) References Cited

U.S. PATENT DOCUMENTS

| | | |
|---|---|---|
| 5,699,428 A | 12/1997 | McDonnal et al. |
| 5,944,824 A | 8/1999 | He |

(Continued)

OTHER PUBLICATIONS

Stoica, Adrian; Office Action; U.S. Appl. No. 14/195,279; dated Jun. 24, 2015; United States Patent and Trademark Office; Alexandria, Virginia.

(Continued)

*Primary Examiner* — Jung W Kim
*Assistant Examiner* — Adrian Stoica
(74) *Attorney, Agent, or Firm* — Meyertons, Hood, Kivlin, Kowert & Goetzel, P.C.

(57) ABSTRACT

Sanitizing passwords used in a shared, privileged account includes providing a password of a shared account to a user; identifying a first machine logged into using the password; determining when the first machine enters an inconsistent state; and modifying a memory area associated with the first machine to eliminate occurrences of the password in the memory area.

19 Claims, 4 Drawing Sheets

(56) References Cited

U.S. PATENT DOCUMENTS

| | | |
|---|---|---|
| 2007/0171921 A1 | 7/2007 | Wookey et al. |
| 2007/0220271 A1 | 9/2007 | Law |
| 2009/0034731 A1* | 2/2009 | Oshima ................. G06F 21/608 380/270 |
| 2010/0210240 A1 | 8/2010 | Mahaffey et al. |
| 2012/0179802 A1 | 7/2012 | Narasimhan et al. |
| 2013/0145457 A1 | 6/2013 | Papakipos et al. |
| 2014/0075550 A1 | 3/2014 | Mirashrafi et al. |
| 2014/0115709 A1 | 4/2014 | Gross et al. |
| 2014/0189808 A1 | 7/2014 | Mahaffey et al. |
| 2015/0007350 A1 | 1/2015 | Gudipati |
| 2015/0095970 A1 | 4/2015 | Shetty |
| 2015/0150110 A1 | 5/2015 | Canning et al. |

OTHER PUBLICATIONS

Stoica, Adrian; Office Action; U.S. Appl. No. 14/195,279; dated Dec. 4, 2015; United States Patent and Trademark Office; Alexandria, Virginia.

Stoica, Adrian; Notice of Allowance and Fees Due; U.S. Appl. No. 14/195,279; dated Feb. 24, 2016; United States Patent and Trademark Office; Alexandria, Virginia.

* cited by examiner

PRIVILEGED SHARED ACCOUNT PASSWORD SANITATION

CROSS-REFERENCE TO RELATED APPLICATIONS

This application is a continuation of U.S. patent application Ser. No. 14/195,279, entitled PRIVILEGED SHARED ACCOUNT PASSWORD SANITATION, filed Mar. 3, 2014, the disclosure of which is hereby incorporated by reference in its entirety.

BACKGROUND

The present disclosure relates to access control, and more specifically, to securely providing access control.

Privileged accounts are accounts that are not assigned to individual accounts and have access to mission critical data and processes. System Administrators typically use privileged accounts to perform administrative tasks on target endpoints and privileged accounts can also be embedded in service files, scripts, and configuration files to facilitate unattended processing.

Privileged accounts may be difficult to control because they are not assigned to an identifiable user, which renders auditing and tracing difficult. This is often seen as a vulnerability that exposes mission critical systems to accidental harm and malicious activities. For security reasons, organizations try to reduce the number of these privileged accounts to a minimum that satisfies operational needs.

Privileged User Password Management (PUPM) is the process through which an organization secures, manages, and tracks all activities associated with the most powerful accounts within the organization.

PUPM provides role-based access management for privileged accounts on target endpoints from a central location. PUPM provides secure storage of privileged accounts and application ID passwords and controls access to privileged accounts and passwords based on policies defined by a system administrator. Further, PUPM manages privileged accounts and application password lifecycle and allows removal of passwords from configuration files and scripts.

Additional security-related issues may arise when a target system involves a virtual device. When a password is checked out from, or used to log into, a virtual device, that virtual device may be suspended or a snapshot can be taken of the device thereby creating in some physical storage device a stored image of the contents of that virtual device. Current tools exist for scanning and analyzing such stored images in such a way as too identify checked out passwords that may be present.

BRIEF SUMMARY

According to one aspect of the present disclosure, a method for sanitizing passwords, includes providing a password of a shared account to a user; identifying a first machine logged into using the password; determining when the first machine enters an inconsistent state; identifying, in a first memory area associated with the first machine, one or more occurrences of the password; and modifying the first memory area associated with the first machine by replacing each occurrence of the password with a first predetermined marker in order to eliminate occurrences of the password in the first memory area.

According to another aspect of the present disclosure, a system for sanitizing passwords that includes a computer processor and a memory in communication with the computer processor storing instructions that when executed by the computer processor: a) provide a password of a shared account to a user; b) identify a first machine logged into using the password; c) determine when the first machine enters an inconsistent state; d) identify in a first memory area associated with the first machine one or more occurrences of the password; and e) modify the first memory area associated with the first machine by replacing each occurrence of the password with a first predetermined marker in order to eliminate occurrences of the password in the first memory area.

According to another aspect of the present disclosure, a computer program product for sanitizing passwords includes a computer readable storage medium having computer readable program code embodied therewith. The computer readable program code includes a) computer readable program code for providing a password of a shared account to a user; b) computer readable program code for identifying a first machine logged into using the password; c) computer readable program code for determining when the first machine enters an inconsistent state; d) computer readable program code for identifying in a first memory area associated with the first machine one or more occurrences of the password; and e) computer readable program code for modifying the first memory area associated with the first machine by replacing each occurrence of the password with a first predetermined marker in order to eliminate occurrences of the password in the first memory area.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
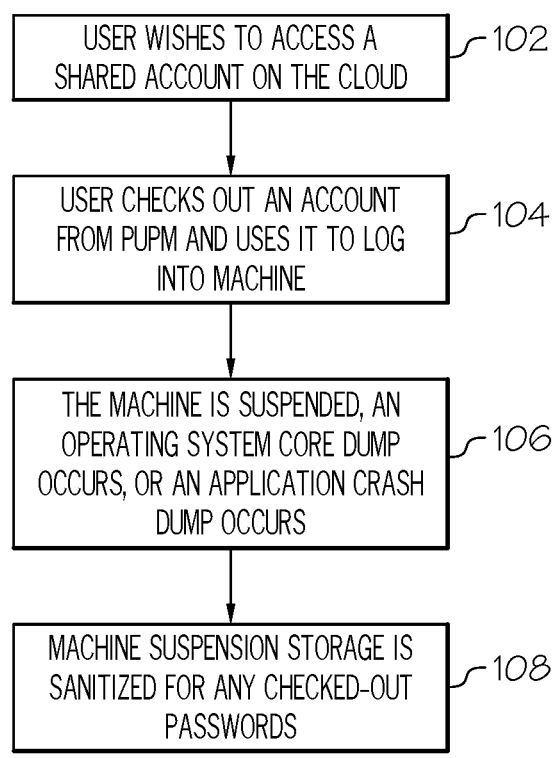
FIG. 1 is a flowchart of an example method of sanitizing PUPM passwords in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a flowchart of an example method of sanitizing PUPM passwords in accordance with the principles of the present disclosure. The steps shown in FIG. 1 provide a broad overview of the present disclosure and more details are provided below with reference to other figures. In step 102, a user on a particular machine wishes to access a shared account on that machine or possibly another resource coupled to a cloud computing environment. For example, a virtual machine may be provided in the cloud that a user wishes to access in the role of a system administrator or some other privileged account. The shared account may not necessarily be limited to being on a virtual machine; the shared account may be on a physical machine as well. Thus, both the machine a user is using and a machine the user wishes to access can be either a physical machine or a virtual machine.

In step 104, the user communicates with a central access control server that manages PUPM accounts in order to acquire credentials that will allow the user to access the desired virtual machine (or physical machine). In particular, the user provides their own credentials so that the access control server can determine whether the user has sufficient privileges to check-out shared account credentials for the desired shared account. If so, then the access control server can provide the user with a password for the desired shared account. With the provided password, the user can then log into the virtual machine using the shared account/password combination and utilize features of the virtual machine.

If the virtual machine, or physical machine, enters an inconsistent and/or dormant state, in step 106, then the password information may be stored on physical storage devices that are part of the cloud hardware that implements the virtual machine or be stored on the physical storage devices associated with the physical machine. Accordingly, that password information may then be vulnerable to detection by parties that have access to those physical storage devices. A virtual machine, or physical machine, may, for example, enter a suspended state after a predetermined period of inactivity. Alternatively, a user of that machine can expressly suspend operation of the machine. Other inconsistent states can occur when an operating system crashes and creates a core dump or an application crashes and creates log file entries and other crash reports. A dormant or suspended state can also be considered an inconsistent state in accordance with the principles of this disclosure.

In step 108, physical storage associated with the suspended machine (either a physical or virtual machine) is analyzed to identify and locate any password information related to the shared account accessed in step 104 above. Once this password information is located, it is then removed, or sanitized, from the physical storage device.

Figure 2:
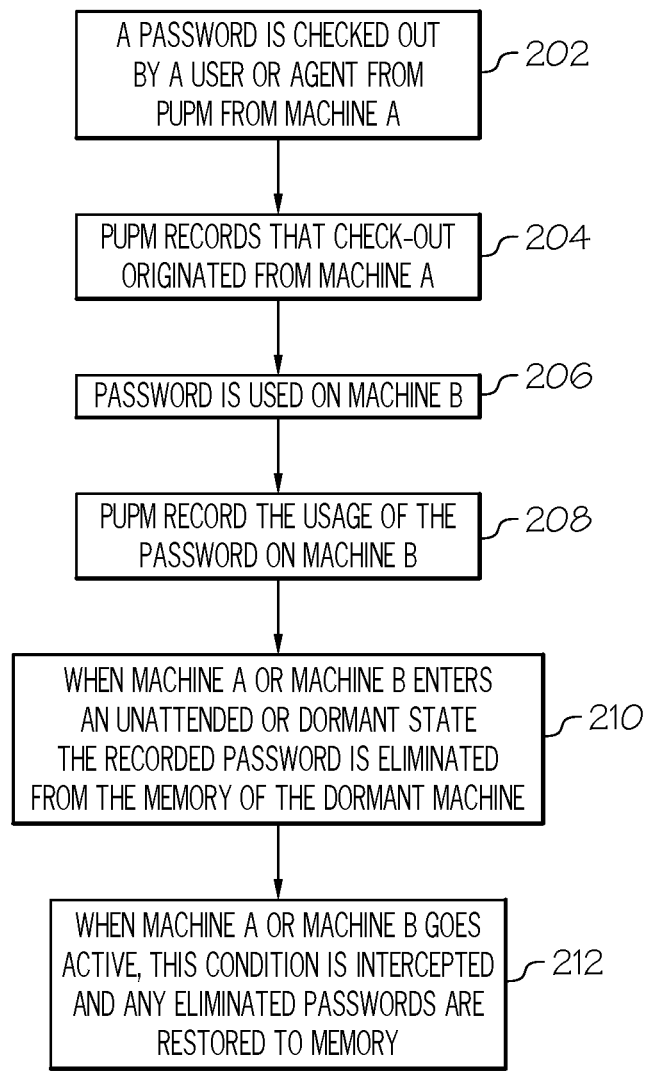
FIG. 2 is a flowchart that provides additional details of some of the steps depicted in FIG. 1 in accordance with the principles of the present disclosure.

FIG. 2 is a flowchart that provides additional details of some of the steps depicted in FIG. 1 in accordance with the principles of the present disclosure. In step 202, a user on a first machine (e.g., Machine A) checks-out a password from a centralized PUPM server or Access Control (AC) server. For purposes of the present disclosure, the term PUPM server and AC server are used interchangeably. Thus, there may be information now resident in the memory of Machine A that could reveal the password for a shared account. Accordingly, in step 204, the PUPM server records that a checkout of a particular password occurred from Machine A.

In step 206, the user then uses the password to access a shared account on Machine B. Thus, there may be information now resident in the memory of Machine B that could reveal the password for the shared account. Accordingly, in step 206, the PUPM server records the use of that password on Machine B.

The PUPM server also includes password sanitation logic, or a password sanitation module, that can include one or more software modules that help perform password sanitation in accordance with the principles of the present disclosure, in step 210. In particular, the sanitation logic can periodically communicate with Machine A and Machine B to determine if they are in an active state or an inconsistent state (e.g., a suspended state). For example, if no response to a query from the PUPM server is received from a machine, then that machine is considered to be in a dormant state. The dormant state may be entered because of user inactivity or because of an operating system crash. Also, a machine can be configured to proactively send a message to the PUPM server alerting the PUPM server that the machine is going to enter a suspended state. Regardless of the specific manner in which the PUPM server becomes aware of the dormant or inconsistent state of either Machine A or Machine B, the sanitation logic can eliminate any password information from the memory of that machine or an image of the machine's memory that may have been stored on a physical storage device. For example, if Machine A is a virtual device that is suspended, then the sanitation logic could remotely mount the suspended image of that virtual machine and eliminate the password from that image. In general, the sanitation logic modifies memory areas or storage devices related to Machine A (or Machine B) so as to remove or eliminate occurrences of the password from that memory or storage.

As an alternative, the sanitation logic of the PUPM server may periodically sanitize the memory of Machine A or Machine B regardless of whether or not that machine has entered a dormant state. For example, every 15 minutes, the sanitation logic may simply as a precaution identify password information stored in memory of either Machine A or Machine B and remove it. Thus, the modification of the memory areas can occur before a machine enters an inconsistent state, or once a machine indicates it is about to enter an inconsistent state, or once the machine is determined to have already entered an inconsistent state.

Because the PUPM server recorded (in steps 204 and 208) the password that was checked out and used, the sanitation logic has access to exactly what information to search for when analyzing the memory areas and/or storage associated of Machine A or Machine B. Furthermore, a priori knowledge about how core dumps are stored, how application dump files are created, and how log files are appended can allow the sanitation logic to search a focused portion of the memory areas associated with Machine A or Machine B when attempting to identify password information.

In step 210, when a password is removed or sanitized from memory, the sanitation logic may beneficially place a marker or some other easily recognizable placeholder in the memory areas where the password was located. In this way, when the machine is restarted, enters an active state, or once again attempts to utilize that password information, the sanitation logic can restore the appropriate password to the correct area of memory in step 212. For example, when a virtual machine is unsuspended, part of its wake-up procedure may be to communicate its new status with the PUPM server which then restores password information to the virtual machine's image.

Figure 3:
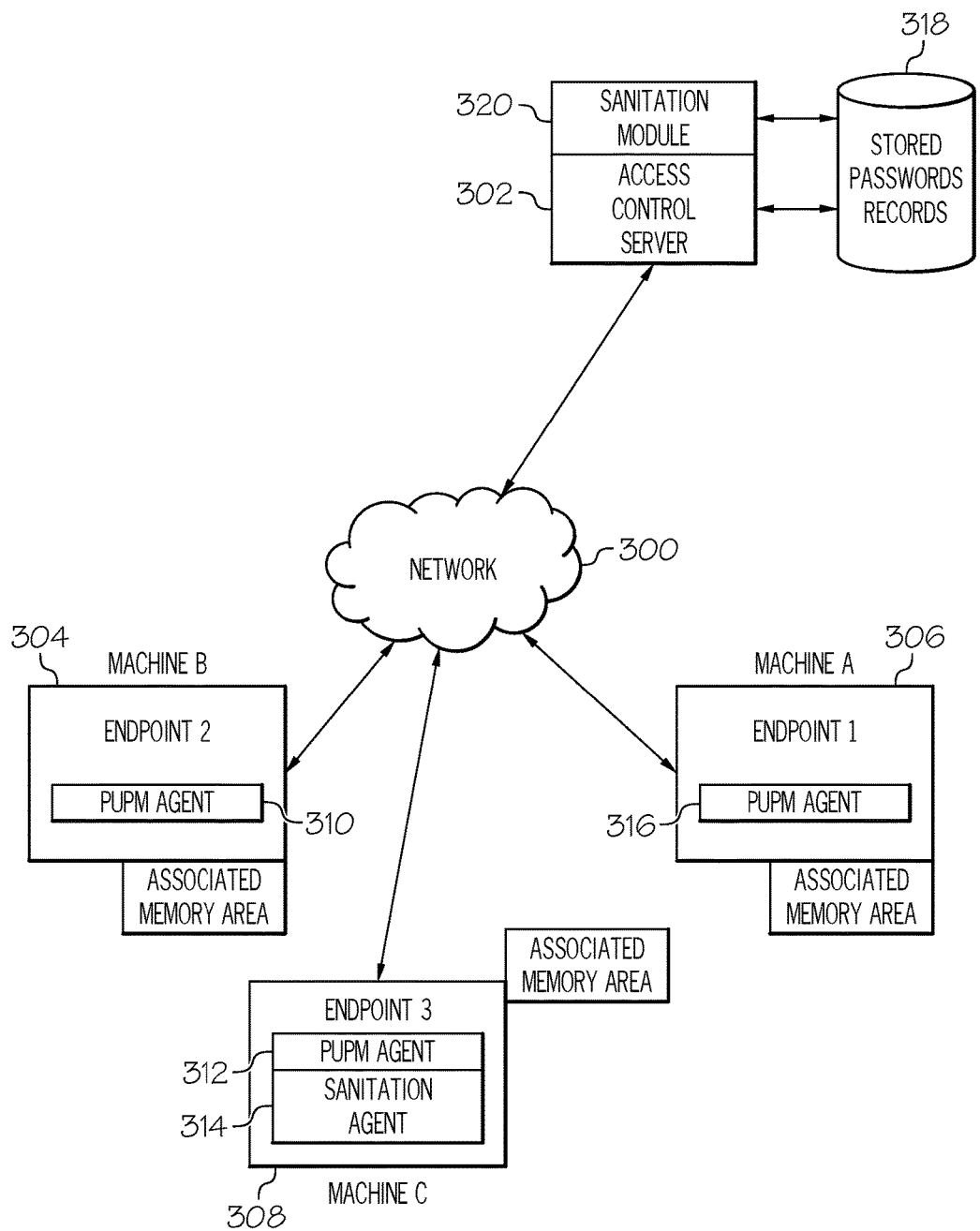
FIG. 3 illustrates an example computing environment in which a password sanitation framework can be deployed in accordance with the principles of the present disclosure.

FIG. 3 illustrates an example computing environment in which a password sanitation framework can be deployed in accordance with the principles of the present disclosure.

In FIG. 3, there are three endpoints 304, 306, 308 coupled through a network 300 with a PUPM server or an access control (AC) server 302. Each of the endpoint 304, 306, 308 includes an associated memory area, or storage that can be sanitized of passwords. The AC server 302 maintains a database 318 of records that relate to shared account passwords that are presently being used by a user of one or more of the endpoints 304, 306, 308. Each of the endpoints 304, 306, 308 can be considered as a separate machine (either physical or virtual machines such as Machine A, Machine B, or Machine C) which a user can access. Each of the endpoints 304, 306, 308 can also include a respective PUPM agent 310, 316, and 312 which allows a user of an endpoint to check out and utilize shared account passwords from the AC server 302. Thus, a user can check-out a password from the AC server 302 from one endpoint and utilize that password to access another one of the endpoints.

In FIG. 3, the sanitizing module 320 is shown as a part of the PUPM server, or AC server 302. One of ordinary skill will recognize that the sanitizing module 320 may be implemented on a separate machine or alternative machines without departing from the scope of the present disclosure. The module 320 may perform the sanitizing logic described with respect to FIG. 2 as well as tracking and storing the password information in the database 318.

With respect to endpoint 1 306 (e.g., Machine A) and endpoint 2 304 (e.g., Machine B), the sanitizing module 320 operates in an agentless manner. In other words, the sanitizing module 320 includes all the logic used to: a) detect if an endpoint is in an inconsistent or dormant state, b) identify memory areas that contain password information, c) sanitize those passwords from memory, d) detect when the endpoint is once again active, and d) restore any password information to appropriate memory areas.

Some of those functions may alternatively be performed by an agent executing on an endpoint. For example, endpoint 3 308 (e.g., Machine C) includes a sanitation agent 314 that could perform some of the functions identified above with respect to sanitizing module 320. For example, the agent 314 may send a trigger signal to the sanitizing module 320 when a system or application crash is detected at endpoint 3 308. The agent 314 may also be responsible for removing the password information from memory periodically or additional sanitation-related functions.

Figure 4:
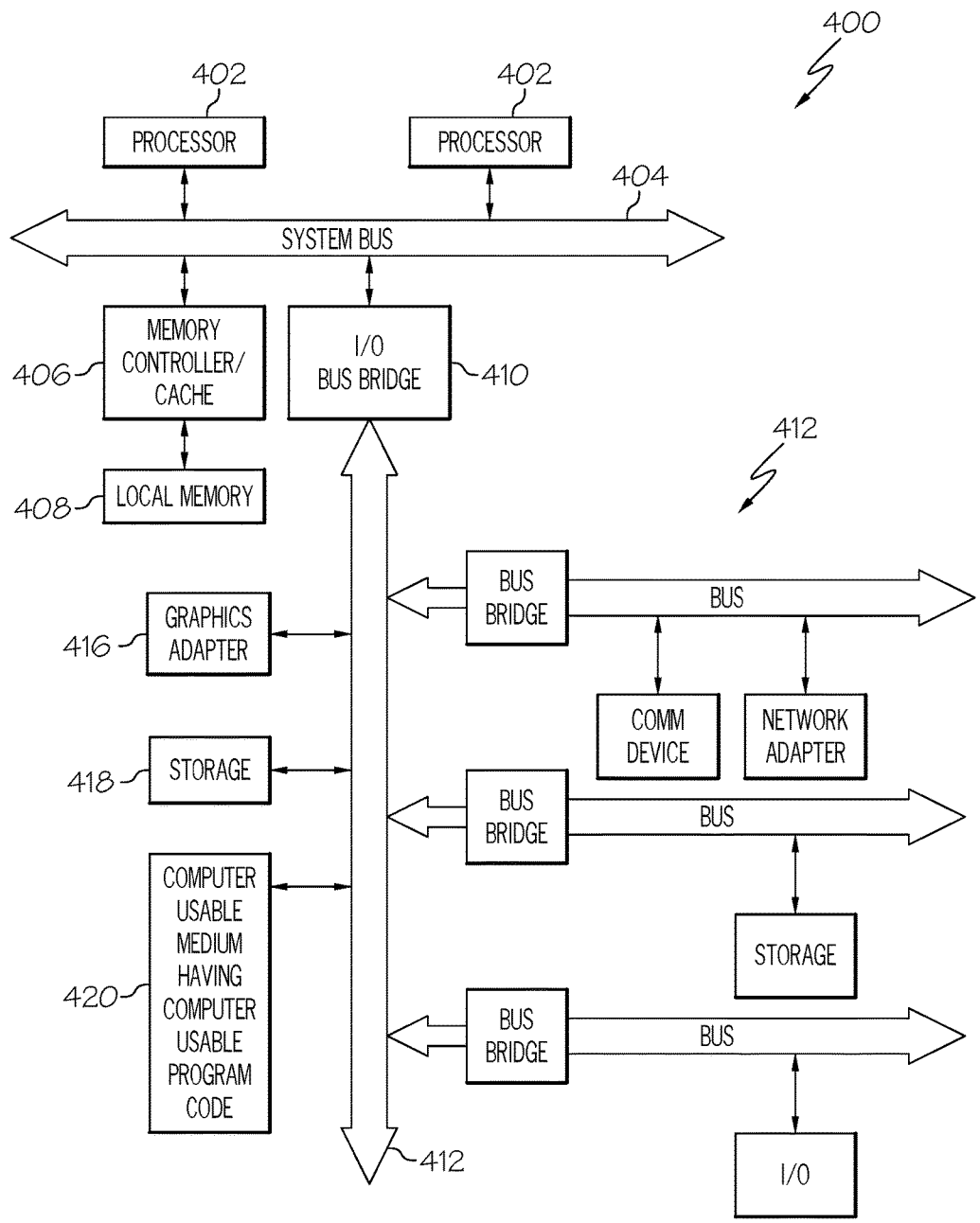
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 302 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method for sanitizing passwords, comprising:
   providing, by a computer, a password of a shared account to a user;
   identifying, by the computer, a first machine logged into using the password;
   determining, by the computer, when the first machine enters an inconsistent state, including by determining that a predetermined time period has elapsed since a first memory area associated with the first machine was modified by replacing each occurrence of the password with a first predetermined recognizable marker;
   in response to determining the first machine enters the inconsistent state, identifying, in the first memory area associated with the first machine, one or more occurrences of the password; and
   modifying, by the computer, the first memory area associated with the first machine by replacing each occurrence of the password with the first predetermined recognizable marker in order to eliminate occurrences of the password in the first memory area.

2. The method of claim 1, further comprising:
   receiving, by the computer, a request from the user for the password.

3. The method of claim 2, further comprising:
   determining, by the computer, that the request originated from a second machine different than the first machine.

4. The method of claim 3, further comprising:
   determining, by the computer, when the second machine enters an inconsistent state;
   identifying, in a second memory area associated with the second machine, one or more occurrences of the password; and
   modifying, by the computer, the second memory area associated with the second machine by replacing each occurrence of the password with a second predetermined recognizable marker in order to eliminate occurrences of the password in the second memory area.

5. The method of claim 1, wherein the first machine is one of a virtual machine and a physical machine.

6. The method of claim 1, wherein the first machine is a virtual machine and the inconsistent state is a virtual machine snapshot of the first machine.

7. The method of claim 1, wherein the inconsistent state is an operating system crash.

8. The method of claim 1, wherein the inconsistent state is an application crash.

9. The method of claim 1, further comprising:
   identifying in the first memory area one or more occurrences of the first predetermined recognizable marker; and
   modifying, by the computer, the first memory area associated with the first machine to replace occurrences of the first predetermined recognizable marker with the password.

10. A system for sanitizing passwords, comprising:
    a computer processor; and
    a memory in communication with the computer processor storing instructions that when executed by the computer processor:
       provide a password of a shared account to a user;
       identify a first machine logged into using the password;

determine when the first machine enters an inconsistent state, including by determining that a predetermined time period has elapsed since a first memory area associated with the first machine was modified by replacing each occurrence of the password with a first predetermined recognizable marker;

in response to the first machine entering the inconsistent state, identify, in the first memory area associated with the first machine, one or more occurrences of the password; and modify the first memory area associated with the first machine by replacing each occurrence of the password with the first predetermined recognizable marker in order to eliminate occurrences of the password in the first memory area.

11. The system of claim 10, wherein:

the memory in communication with the computer processor stores further instructions that, when executed by the computer processor, receive a request from the user for the password.

12. The system of claim 11, wherein the memory in communication with the computer processor stores further instructions that, when executed by the computer processor, determine that the request originated from a second machine different than the first machine.

13. The system of claim 12, wherein the memory in communication with the computer processor stores further instructions that, when executed by the computer processor:

determine when the second machine enters an inconsistent state;

identify, in a second memory area associated with the second machine, one or more occurrences of the password; and modify the second memory area associated with the second machine by replacing each occurrence of the password with a second predetermined marker in order to eliminate occurrences of the password in the second memory area associated with the second machine.

14. The system of claim 10, wherein the first machine is one of a virtual machine and a physical machine.

15. The system of claim 10, wherein the first machine is a virtual machine and the inconsistent state is a virtual machine snapshot of the first machine.

16. The system of claim 10, wherein the inconsistent state is an operating system crash.

17. The system of claim 10, wherein the inconsistent state is an application crash.

18. The system of claim 10, wherein the memory in communication with the computer processor stores further instructions that, when executed by the computer processor:

identify in the first memory area one or more occurrences of the first predetermined recognizable marker; and modify the first memory area associated with the first machine to replace occurrences of the first predetermined recognizable marker with the password.

19. A computer program product for sanitizing passwords, comprising:

a non-transitory computer readable storage medium having computer readable program code embodied therewith, the computer readable program code comprising:

computer readable program code for providing a password of a shared account to a user;

computer readable program code for identifying a first machine logged into using the password;

computer readable program code for determining when the first machine enters an inconsistent state, including by determining that a predetermined time period has elapsed since a first memory area associated with the first machine was modified by replacing each occurrence of the password with a first predetermined recognizable marker;

computer readable program code for in response to determining the first machine enters the inconsistent state, identifying: in the first memory area associated with the first machine, one or more occurrences of the password; and computer readable program code for modifying the first memory area associated with the first machine by replacing each occurrence of the password with a first predetermined recognizable marker in order to eliminate occurrences of the password in the first memory area.

\* \* \* \* \*